United States Patent
Hosokawa

(10) Patent No.: US 9,621,026 B2
(45) Date of Patent: Apr. 11, 2017

(54) POWER CONVERSION APPARATUS

(75) Inventor: Yasuhiko Hosokawa, Chuo-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 447 days.

(21) Appl. No.: 14/373,708

(22) PCT Filed: Mar. 2, 2012

(86) PCT No.: PCT/JP2012/055377
§ 371 (c)(1),
(2), (4) Date: Jul. 22, 2014

(87) PCT Pub. No.: WO2013/128632
PCT Pub. Date: Sep. 6, 2013

(65) Prior Publication Data
US 2014/0346880 A1    Nov. 27, 2014

(51) Int. Cl.
*H02M 1/00* (2006.01)
*H02M 1/34* (2007.01)
*H02M 7/5387* (2007.01)
*H02M 7/537* (2006.01)

(52) U.S. Cl.
CPC ............ *H02M 1/34* (2013.01); *H02M 7/537* (2013.01); *H02M 7/5387* (2013.01); *H02M 2001/0003* (2013.01); *H02M 2001/0058* (2013.01); *H02M 2001/346* (2013.01); *Y02B 70/1491* (2013.01); *Y10T 307/549* (2015.04)

(58) Field of Classification Search
CPC ............................................. H02M 2001/003
USPC ........................................................... 307/52
See application file for complete search history.

(56) References Cited

U.S. PATENT DOCUMENTS 8,508,962 B2   8/2013   Hosokawa et al.
8,605,470 B2   12/2013   Hosokawa et al.

FOREIGN PATENT DOCUMENTS

WO   2010 125630   11/2010
WO   2011 036912    3/2011

OTHER PUBLICATIONS

International Search Report Issued Jun. 5, 2012 in PCT/JP12/055377 Filed Mar. 2, 2012.
U.S. Appl. No. 14/376,057, filed Jul. 31, 2014, Hosokawa, et al.

*Primary Examiner* — Adi Amrany
(74) *Attorney, Agent, or Firm* — Oblon, McClelland, Maier & Neustadt, L.L.P.

(57) ABSTRACT

When a snubber capacitor is charged to at least a predetermined voltage, a protection circuit renders conductive a clamp diode provided on current paths to complete the charging of the snubber capacitor.

4 Claims, 9 Drawing Sheets

FIG.3
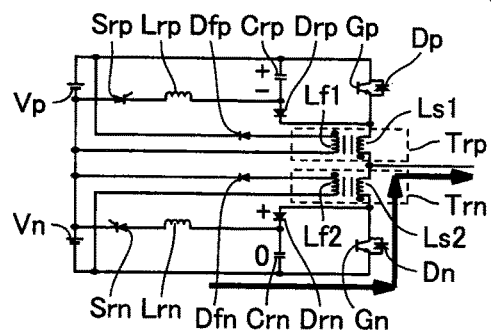
STEP S7
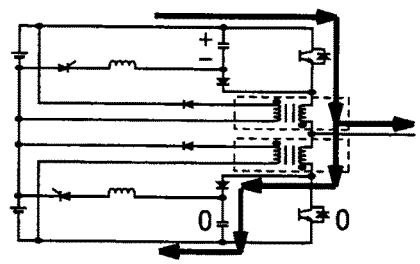
STEP S8
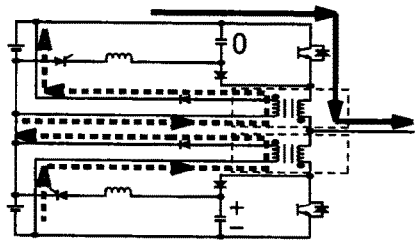
STEP S9
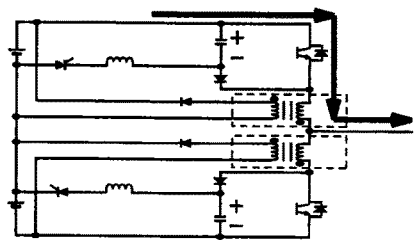
STEP S10
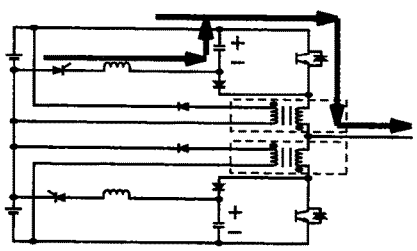
STEP S11
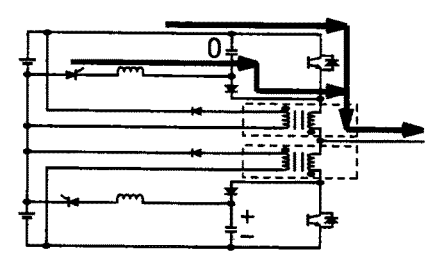
STEP S12

POWER CONVERSION APPARATUS

TECHNICAL FIELD

The present invention relates to power conversion apparatuses, particularly a power conversion apparatus that performs soft-switching.

BACKGROUND ART

A soft-switching inverter that performs soft-switching has been developed. Soft-switching includes zero-current switching that sets the current flowing through a switching device zero to turn ON/OFF that switching device, and zero-volt switching that sets the voltage applied to a switching device zero to turn ON/OFF that switching device. A soft-switching inverter can reduce switching noise and switching loss by such soft-switching.

An example of a soft-switching inverter is disclosed in WO 2011/036912 (PTD 1).

CITATION LIST

Patent Document

PTD 1: WO2011/036912

SUMMARY OF INVENTION

Technical Problem

However, the soft-switching inverter disclosed in PTD 1 (WO 2011/036912) must use an element of high breakdown voltage to apply great voltage to the clamp diode. This is one cause of increasing the cost.

In order to reduce the voltage of the clamp diode, the turns ratio of the transformer has to be reduced, leading to the problem that there is a limit in reducing the voltage duty of the main element.

In view of the foregoing, an object of the present invention is to provide a power conversion apparatus that can reduce voltage applied to a main switching device, a main diode, a snubber capacitor and a clamp diode of a soft-switching inverter.

Solution to Problem

A power conversion apparatus according to an aspect of present invention converts DC power, supplied from a first DC power supply having a first electrode and a second electrode and from a second DC power supply having a first electrode connected to the second electrode of the first DC power supply and a second electrode, into AC power, and supplies the AC power to a load. The power conversion apparatus includes: a first main switch having a first end coupled to the first electrode of the first DC power supply and a second end coupled to the load; a first main diode connected in parallel with the first main switch, so as to have a conducting direction opposite to the conducting direction of the first main switch; a first snubber capacitor connected in parallel with the first main switch and the first main diode; a first snubber diode connected in series with the first snubber capacitor and connected between the first snubber capacitor and the second end of the first main switch, so as to have a conducting direction identical to the conducting direction of the first main switch; a first auxiliary switch and a first auxiliary reactor connected between a connection node of the first and second DC power supplies and a connection node of the first snubber capacitor and the first snubber diode, and connected in series with each other; a second main switch having a first end coupled to the second end of the first main switch and a second end coupled to the second electrode of the second DC power supply, provided so as to have a conducting direction identical to the conducting direction of the first main switch; a second main diode connected in parallel with the second main switch, so as to have a conducting direction opposite to the conducting direction of the second main switch; a second snubber capacitor connected in parallel with the second main switch and the second main diode; a second snubber diode connected in series with the second snubber capacitor and connected between the second snubber capacitor and the first end of the second main switch, so as to have a conducting direction identical to the conducting direction of the second main switch; a second auxiliary switch and a second auxiliary reactor connected between a connection node of the first and second DC power supplies with the first auxiliary switch or first auxiliary reactor and a connection node of the second snubber capacitor and the second snubber diode, and connected in series with each other; and a protection circuit for causing, when voltage applied to the first snubber capacitor becomes greater than or equal to a predetermined value or when voltage applied to the second snubber capacitor becomes greater than or equal to the predetermined value, a charging current formerly flowing from the first DC power supply and second DC power supply to the first snubber capacitor or second snubber capacitor to flow to another current path. The protection circuit includes a first transformer and a second transformer, and a first clamp diode and a second clamp diode. The first transformer includes a first primary winding connected between the second end of the first main switch and the load, and a first secondary winding connected between the first electrode of the first DC power supply and the second electrode of the first DC power supply, and magnetically coupled to the first primary winding. The second transformer includes a second primary winding connected between the first end of the second main switch and the load, and a second secondary winding connected between the first electrode of the second DC power supply and the second electrode of the second DC power supply, and magnetically coupled to the second primary winding. The first secondary winding and the first clamp diode are connected in series between the first electrode of the first DC power supply and the second electrode of the first DC power supply. The first secondary winding and the second clamp diode are connected in series between the first electrode of the first DC power supply and the second electrode of the first DC power supply. The first secondary winding and the first clamp diode are connected in series. The first primary winding and the second primary winding are connected in series. The connection node of the first primary winding and the second primary winding is connected to the load.

Advantageous Effects of Invention

According to the present invention, the voltage applied to a main switching device, a main diode, a snubber capacitor, and a clamp diode of a soft-switching inverter can be reduced.

BRIEF DESCRIPTION OF DRAWINGS

FIG. 3 represents the current flow in time series during power conversion by the soft-switching inverter according to an embodiment of the present invention.

DESCRIPTION OF EMBODIMENTS

Figure 1:
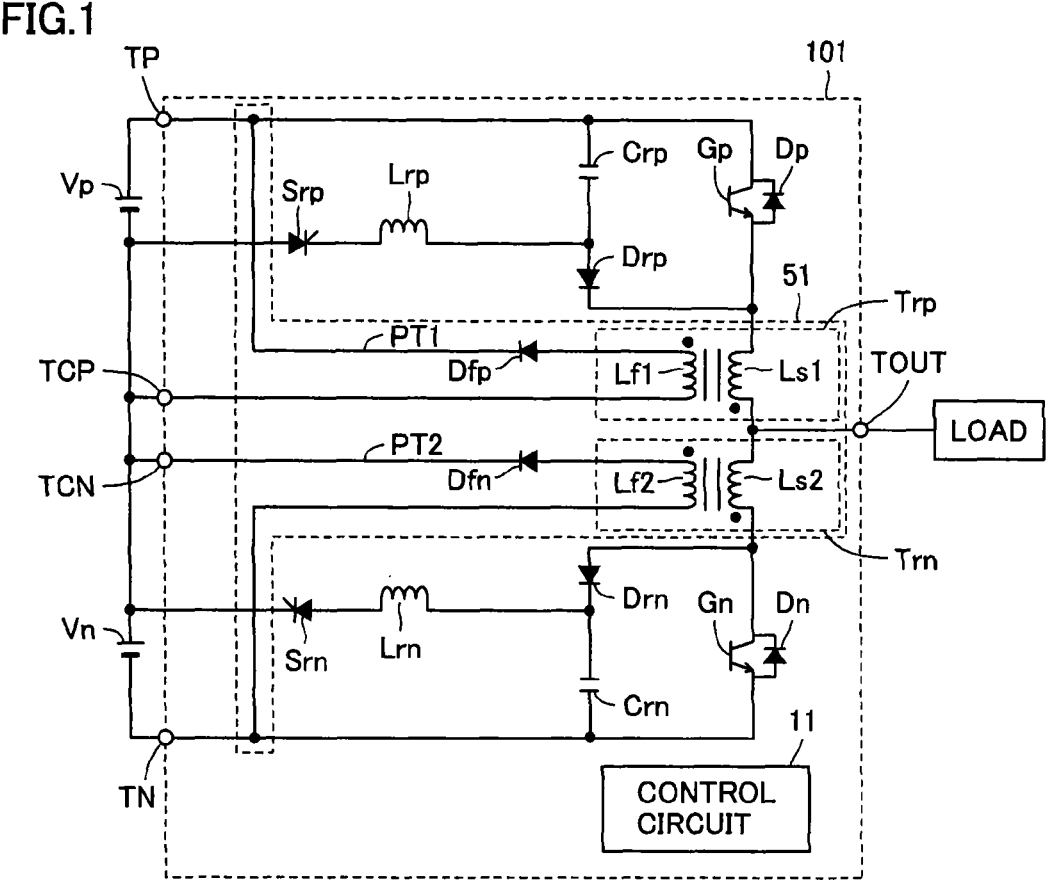
FIG. 1 represents a configuration of a soft-switching inverter according to an embodiment of the present invention.

Embodiments of the present invention will be described hereinafter with reference to the drawings. In the drawings, the same or corresponding elements have the same reference characters allotted, and description thereof will not be repeated.

Embodiments

FIG. 1 represents a configuration of a soft-switching inverter according to an embodiment of the present invention.

Referring to FIG. 1, a soft-switching inverter (power conversion apparatus) 101 includes power supply terminals TP, TCP, TCN and TN, an AC output terminal TOUT, main switches Gp and Gn, main diodes Dp and Dn, snubber capacitors Crp and Crn, snubber diodes Drp and Drn, auxiliary switches Srp and Srn, auxiliary reactors Lrp and Lrn, a control circuit 11, and a protection circuit 51.

Protection circuit 51 includes transformers Trp and Trn, and clamp diodes Dfp and Dfn. Transformer Trp includes a primary winding Ls1 and a secondary winding Lf1. Transformer Trn includes a first primary winding Ls2 and a secondary winding Lf2. Soft-switching inverter 101 may be configured to include DC power supplies Vp and Vn.

Main switches Gp and Gn are IGBTs (Insulated Gate Bipolar Transistors), for example. Auxiliary switches Srp and Srn are reverse blocking thyristors, for example.

DC power supplies Vp and Vn are connected in series. Specifically, DC power supply Vp includes a positive electrode connected to power supply terminal TP, and a negative electrode connected to power supply terminals TCP and TCN. DC power supply Vn includes a positive electrode connected to the negative electrode of DC power supply Vp and power supply terminals TCP and TCN, and a negative electrode connected to power supply terminal TN.

Main switch Gp includes a collector coupled to the positive electrode of DC power supply Vp, and an emitter connected to the load via AC output terminal TOUT. In other words, main switch Gp includes a collector connected to power supply terminal TP, and an emitter connected to the first end of primary winding Ls1 of transformer Tr.

Main diode Dp is connected in parallel with main switch Gp so as to have a conducting direction opposite to that of main switch Gp. In other words, main diode Dp includes a cathode connected to the collector of main switch Gp, and an anode connected to the emitter of main switch Gp.

Snubber capacitor Crp is connected in parallel with main switch Gp and main diode Dp. Snubber diode Drp is connected in parallel with main switch Gp and main diode Dp and in series with snubber capacitor Crp so as to have a conducting direction identical to that of main switch Gp. In other words, snubber diode Drp includes an anode connected to a second end of snubber capacitor Crp and a second end of auxiliary reactor Lrp, and a cathode connected to the emitter of main switch Gp and the anode of main diode Dp.

Auxiliary switch Srp and auxiliary reactor Lrp are connected between the connection node of DC power supply Vp and DC power supply Vn, i.e. power supply terminal TCP, and the connection node of snubber capacitor Crp and snubber diode Drp, and in series with each other. In other words, auxiliary switch Srp includes an anode connected to power supply terminal TCP, and a cathode connected to the first end of auxiliary reactor Lrp. Auxiliary reactor Lrp includes a first end connected to the cathode of auxiliary switch Srp and a second end connected to the connection node of snubber capacitor Crp and snubber diode Drp.

Main switch Gn includes a collector coupled to the emitter of main switch Gp, and an emitter coupled to the negative electrode of DC power supply Vn, and is provided so as to have a conducting direction identical to that of main switch Gp. In other words, main switch Gn includes a collector connected to the second end of primary winding Ls2 of transformer Tr, and an emitter connected to power supply terminal TN.

Main diode Dn is connected in parallel with main switch Gn so as to have a conducting direction opposite to that of main switch Gn. In other words, main diode Dn includes a cathode connected to the collector of main switch Gn, and an anode connected to the emitter of main switch Gn.

Snubber capacitor Crn is connected in parallel with main switch Gn and main diode Dn. Snubber diode Drn is connected in parallel with main switch Gn and main diode Dn, and in series with snubber capacitor Crn so as to have a conducting direction identical to that of main switch Gn. In other words, snubber diode Drn includes a cathode connected to the first end of snubber capacitor Crn and the second end of auxiliary reactor Lrn, and an anode connected to the collector of main switch Gn and the cathode of main diode Dn.

Auxiliary switch Srn and auxiliary reactor Lrn are connected between the connection node of DC power supplies Vp and Vn and auxiliary switch Srp, i.e. power supply terminal TCN, and the connection node of snubber capacitor Crn and snubber diode Drn, and in series with each other. In other words, auxiliary switch Srn includes a cathode connected to power supply terminal TCN, and an anode connected to the first end of auxiliary reactor Lrn. Auxiliary reactor Lrn includes a first end connected to the anode of auxiliary switch Srn, and a second end connected to the connection node of snubber capacitor Crn and snubber diode Drn.

Protection circuit 51 is connected between the emitter of main switch Gp and the collector of main switch Gn. At protection circuit 51, primary windings Ls1 and Ls2 are connected between the emitter of main switch Gp and the collector of main switch Gn. In other words, primary winding Ls1 includes a first end connected to the emitter of main switch Gp and the cathode of snubber diode Drp, and a second end connected to AC output terminal TOUT and the first end of primary winding Ls2. Primary winding Ls2 includes a first end connected to AC output terminal TOUT and the second end of primary winding Ls1, and a second end connected to the collector of main switch Gn and the anode of snubber diode Drn. Primary windings Ls1 and Ls2 have the same winding direction.

Secondary winding Lf1 is connected between the positive electrode of DC power Vp and the connection node between DC power supply Vp and DC power supply Vn, and is magnetically coupled to primary winding Ls1. In other words, secondary winding Lf1 includes a first end connected to the anode of clamp diode Dfp, and a second end connected to power supply terminal TCP. Secondary winding Lf1 has a winding direction opposite to that of primary winding Ls1. The turns ratio of the primary winding to the secondary winding of transformer Trp is 1:n, and n>2, for example.

Secondary winding Lf2 is connected between the connection node of DC power supply Vp and DC power supply Vn, and the negative electrode of DC power supply Vn, and magnetically coupled to primary winding Ls2. In other words, secondary winding Lf2 includes a first end connected to the anode of clamp diode Dfn, and a second end connected to power supply terminal TCN. Secondary winding Lf1 has a winding direction opposite to that of primary winding Ls2. The turns ratio of the primary winding to the secondary winding of transformer Trn is 1:n, and n>2, for example.

Clamp diode Dfp is connected between the positive electrode of DC power supply Vp, and the connection node of DC power supplies Vp and Vn, and in series with secondary winding Lf1. In other words, clamp diode Dfp includes a cathode connected to power supply terminal TP, and an anode connected to the first end of secondary winding Lf1.

Clamp diode Dfn is connected between the connection node of DC power supplies Vp and Vn, and the negative electrode of DC power supply Vn, and in series with secondary winding Lf2. In other words, clamp diode Dfn includes a cathode connected to power supply terminal TCN, and an anode connected to the first end of secondary winding Lf.

At soft-switching inverter 101, the switching of DC power supplied from DC power supplies through main switches Gp and Gn that are the main arms causes the DC power supplied from DC power supply Vp and DC power supply Vn to be converted into AC power, and then supplied to a load via AC output terminal TOUT.

Snubber capacitor Crp is provided to prevent voltage from being applied to main switch Gp when main switch Gp is turned OFF. Snubber capacitor Crn is provided to prevent voltage from being applied to main switch Gn when main switch Gn is turned OFF.

Control circuit 11 controls the switching of main switches Gp and Gn and auxiliary switches Srp and Srn.

Protection circuit 51 has a current path PT1 between the positive electrode of DC power supply Vp and the connection node of DC power supplies Vp and Vn. Protection circuit 51 also has a current path PT2 between the connection node of DC power supplies Vp and Vn and the negative electrode of DC power supply Vn.

Protection circuit 51 uses transformers Trp and Trn to suppress the maximum voltage applied to main switches Gp and Gn to a maximum value VM that is lower than 1.5 times the sum of the output voltages from DC power supplies Vp and Vn. The voltage of the DC power supply is equally set at Vp=Vn=Vdc/2.

The operation during power conversion by the soft-switching inverter according to an embodiment of the present invention will be described with reference to the drawings. First the operation during a positive period in which current flows from soft-switching inverter 101 towards the load will be described. Then, an operation during a negative period in which current flows from the load to soft-switching inverter 101 will be described.

[Operation in Positive Period]

Figure 2:
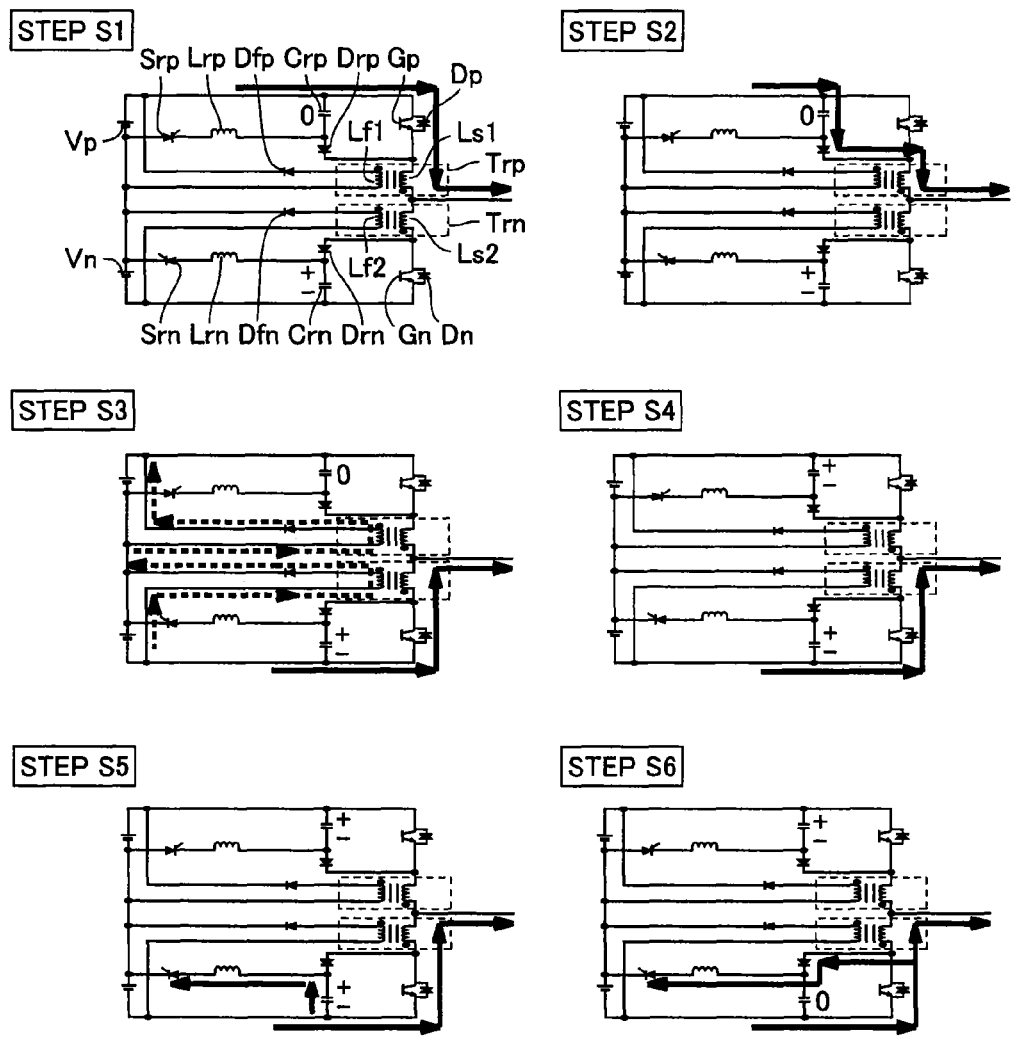
FIG. 2 represents the current flow in time series during power conversion by the soft-switching inverter according to an embodiment of the present invention.
Figure 4:
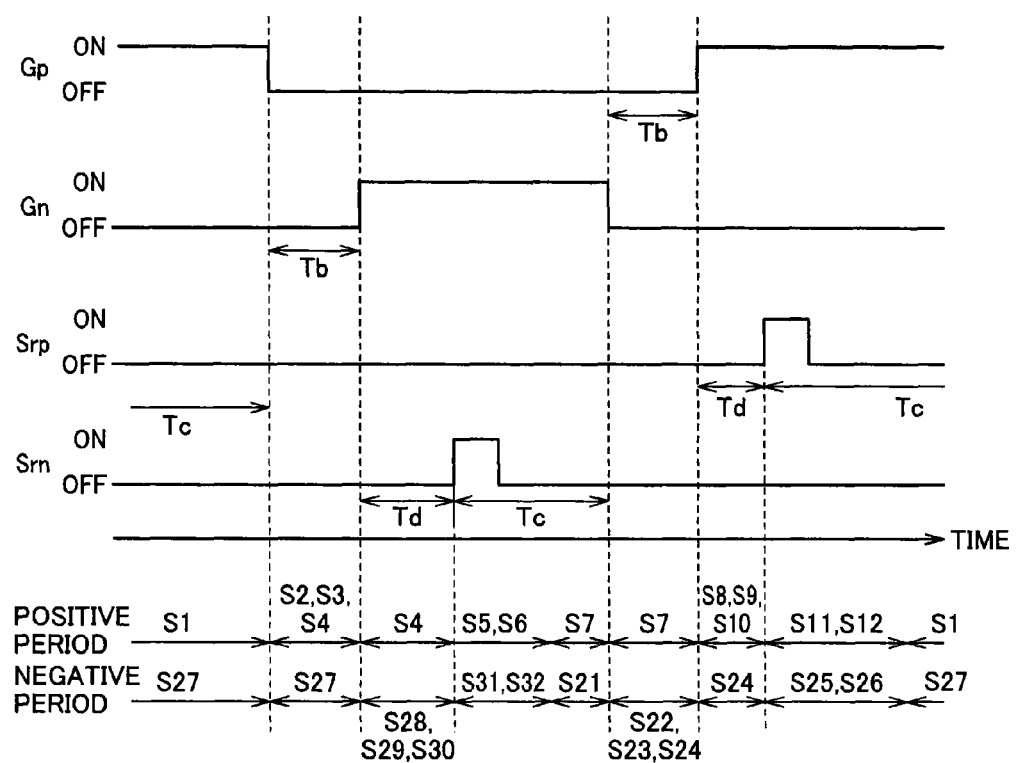
FIG. 4 represents switch control procedures during power conversion by the soft-switching inverter according to an embodiment of the present invention.

FIGS. 2 and 3 represent in time series the flow of current during power conversion by the soft-switching inverter according to an embodiment of the present invention. FIG. 4 represents the switch control procedures during power conversion by the soft-switching inverter according to an embodiment of the present invention. As used herein, DC power supply Vp provides an output voltage of Vp, whereas DC power supply Vn provides an output voltage of Vn.

In FIGS. 2 and 3, the "+" and "−" signs added at the side of snubber capacitors Crp and Crn represent the polarity of the charge of the snubber capacitor.

The horizontal axis in FIG. 4 represents time. Each number in the "positive period" along the horizontal axis represents corresponding steps shown in FIGS. 2 and 3.

Referring to FIGS. 2-4, first the state (step S1) will be described where main switch Gp is controlled to be turned on, main switch Gn is controlled to be turned off, and auxiliary switches Srp and Srn are controlled to be turned off, so that current flows from DC power supply Vp to the load through main switch Gp.

Under this state, main switch Gp is controlled to be turned off. This causes commutation of the current from DC power supply Vp to snubber capacitor Crp. Accordingly, snubber capacitor Crp is charged. When the voltage at snubber capacitor Crp becomes equal to the output voltages (Vp+Vn) of DC power supplies Vp and Vn, main diode Dn is rendered conductive. Conduction of main diode Dn causes the current from DC power supply Vn to flow to the load through main diode Dn (step S2).

At the time of starting step 2, current flows to snubber capacitor Crp when main switch Gp is controlled to be turned off. Since the charge in snubber capacitor Crp is zero when main switch Gp is rendered OFF, voltage is not applied to main switch Gp. Accordingly, zero volt switching is realized.

Then, the current flowing from snubber capacitor Crp to snubber diode Drp decreases by the resonance of snubber capacitor Crp with the exciting inductance at primary windings Ls1 and Ls2, and the current of main diode Dn increases by the resonant current of snubber capacitor Crp and primary windings Ls1 and Ls2 of the transformer.

Moreover, snubber capacitor Crp is charged by the resonant current of snubber capacitor Crp with the exciting inductance of primary windings Ls1 and Ls2 of transformers Trp and Trn.

At this stage, a voltage corresponding to the difference between the output voltages (Vp+Vn) of DC power supplies Vp and Vn and a voltage Vc at snubber capacitor Crp is applied to the series circuit of primary winding Ls1 of transformer Trp and primary winding Ls2 of transformer Trn. Primary windings Ls1 and Ls2 will each carry ½ the aforementioned differential voltage. Specifically, the value of the voltage VL applied to primary windings Ls1 and Ls2 is represented by equation (1) set forth below.

$$VL=\{(Vp+Vn)-Vc\}/2=(Vdc-Vc)/2 \quad (1)$$

Since the turns ratio of transformer Tr is 1:n, a voltage of n×VL is induced at the secondary side. When voltage Vc at snubber capacitor Crp rises and the secondary side voltage of transformers Trp and Trn arrives at Vp=Vn=Vdc/2, clamp diodes Dfp and Dfn are turned ON and snubber diode Drp is turned OFF. Maximum value VM of the snubber capacitor voltage at this stage is represented by equation (2) set forth below.

$$VM=(1+1/n)\times(Vp+Vn)=(1+1/n)\times Vdc \quad (2)$$

Then, current flows as indicated by the broken line shown at step S3 in FIG. 2. The current flowing to snubber capacitor Crp becomes zero, so that snubber capacitor Crp is no longer charged. Accordingly, voltage Vc at snubber capacitor Crp is clamped at the maximum value VM of voltage Vc. Then, when the current flowing through clamp diodes Dfp and Dfn is reduced to eventually become zero, clamp diodes Dfp and Dfn are rendered OFF. The commutation through current paths PT1 and PT2 ends (step S3).

At an elapse of a predetermined time Tb from main switch Gp being turned off, main switch Gn is controlled to be turned on. However, main switch Gn is not rendered conductive since the current from main diode Dn to the load has a current polarity opposite to the conducting direction of main switch Gn. Therefore, current will continuously flow towards the load through main diode Dn (step S4). In other words, current does not flow through main switch Gn when main switch Gn is controlled to be turned on. Accordingly, zero current switching is realized.

Then, at an elapse of a predetermined time Td (≥0) from main switch Gn being turned on, auxiliary switch Srn is controlled to be turned on. Accordingly, discharging starts at snubber capacitor Crn. When discharging is completed and the voltage at snubber capacitor Crn becomes zero, snubber diode Drn is rendered conductive (step S5).

The conduction of snubber diode Drn causes voltage from DC power supply Vn to be applied to auxiliary reactor Lrn. Accordingly, the current flowing through auxiliary switch Srn is reduced to eventually become zero. In response, auxiliary switch Srn and snubber diode Drn are both turned OFF (step S6).

Then, at an elapse of a predetermined time Tc from auxiliary switch Srn being turned on, main switch Gn is controlled to be turned off. In other words, under the state where main diode Dn is still conductive so that the current from DC power supply Vn continuously flows to the load through main diode Dn, main switch Gn is controlled to be turned off (step S7). At this stage, there is no change in the status since main switch Gn is ON, but not conducting.

Then, at an elapse of a predetermined time Tb from main switch Gn being turned off, main switch Gp is controlled to be turned on. This causes commutation of the current from main diode Dn to main switch Gp. When the current flowing from DC power supply Vp through main switch Gp increases to become equal to the load current, the current flowing through main diode Dn becomes zero at the same time, so that main diode Dn is turned off. Thus, the commutation is completed.

At the moment main diode Dn is turned off, snubber diode Drn is rendered conductive. Since the charge in snubber capacitor Crn is zero at this stage, the current flowing from DC power supply Vp through main switch Gp flows towards snubber capacitor Crn. In other words, main diode Dn does not exhibit switching loss since no voltage is applied thereto. Accordingly, zero volt switching is realized (step S8).

Then, the current flowing from snubber capacitor Crn to snubber diode Drn is gradually reduced by the resonance of snubber capacitor Crn and the exciting inductance at primary windings Ls1 and Ls2.

Moreover, snubber capacitor Crn is charged by the resonant current of snubber capacitor Crn and the exciting inductance of primary windings Ls1 and Ls2 of transformer Tr. At this stage, a voltage corresponding to the difference between the output voltages (Vp+Vn(=Vdc)) of DC power supplies Vp and Vn and a voltage Vc at snubber capacitor Crn is applied to the series circuit of primary winding Ls1 and Ls2 of transformer Tr. Therefore, primary windings Ls1 and Ls2 will each carry ½ the aforementioned differential voltage. Specifically, the value of the voltage VL applied to primary windings Ls1 and Ls2 is represented by equation (3) set forth below.

$$VL=\{(Vp+Vn)-Vc\}/2=(Vdc-Vc)/2 \quad (3)$$

Since the turns ratio of transformer Tr is 1:n, a voltage of n×VL is induced at the secondary side. When voltage Vc at snubber capacitor Crn rises and the secondary side voltage of transformer Tr arrives at Vp=Vn=Vdc/2, clamp diodes Dfp and Dfn are turned ON and snubber diode Drn is turned OFF. Maximum value VM of voltage Vc at this stage is represented by equation (4) set forth below.

$$VM=(1+1/n)\times(Vp+Vn)=(1+1/n)\times Vdc \quad (4)$$

Then, current flows as indicated by the broken line shown at step S9 in FIG. 3. The current flowing to snubber capacitor Crn becomes zero, so that snubber capacitor Crn is no longer charged. Accordingly, voltage Vc at snubber capacitor Crn is clamped at VM. Then, when the current flowing through clamp diodes Dfp and Dfn is reduced to eventually become zero, clamp diodes Dfp and Dfn are rendered OFF. The commutation through current paths PT1 and PT2 ends (step S9).

Then, the current from DC power supply Vp flows through main switch Gp to the load (step S10).

Then, at an elapse of a predetermined time Td (≥0) from main switch Gp being turned on, auxiliary switch Srp is controlled to be turned on. Accordingly, discharging starts at snubber capacitor Crp. When discharging is completed and the voltage at snubber capacitor Crp becomes zero, snubber diode Drp is rendered conductive (step S11).

The conduction of snubber diode Drp causes voltage from DC power supply Vp to be applied to auxiliary reactor Lrp. Accordingly, the current flowing through auxiliary switch Srp is reduced to eventually become zero. In response, auxiliary switch Srp and snubber diode Drp are both turned OFF, returning to the state of step S1 (step S12).

At the soft-switching inverter according to an embodiment of the present invention, when voltage Vc at the snubber capacitor reaches voltage value VM in the event of snubber capacitor Crp or Crn being overcharged to a voltage higher than power supply voltage Vdc by the resonance, the energy directed to causing the current to flow through primary windings Ls1 and Ls2 of transformer Tr is shifted to secondary windings Lf1 and Lf2 of transformer Tr, so that no charging current will flow through the snubber capacitor. Therefore, the charging at the snubber capacitor is ceased, and the maximum voltage of the snubber capacitor is clamped at VM. By setting the turns ratio n of transformer Tr at n>2, VM becomes less than or equal to 1.5 times Vdc. Moreover, since VM≈(Vp+Vn) by increasing n, voltage Vc at the snubber capacitor can be suppressed to a value infinitely close to power supply voltage Vdc.

The operation at step S3 and step S4 by the soft-switching inverter according to an embodiment of the present invention will be described in detail hereinafter.

Figure 5:
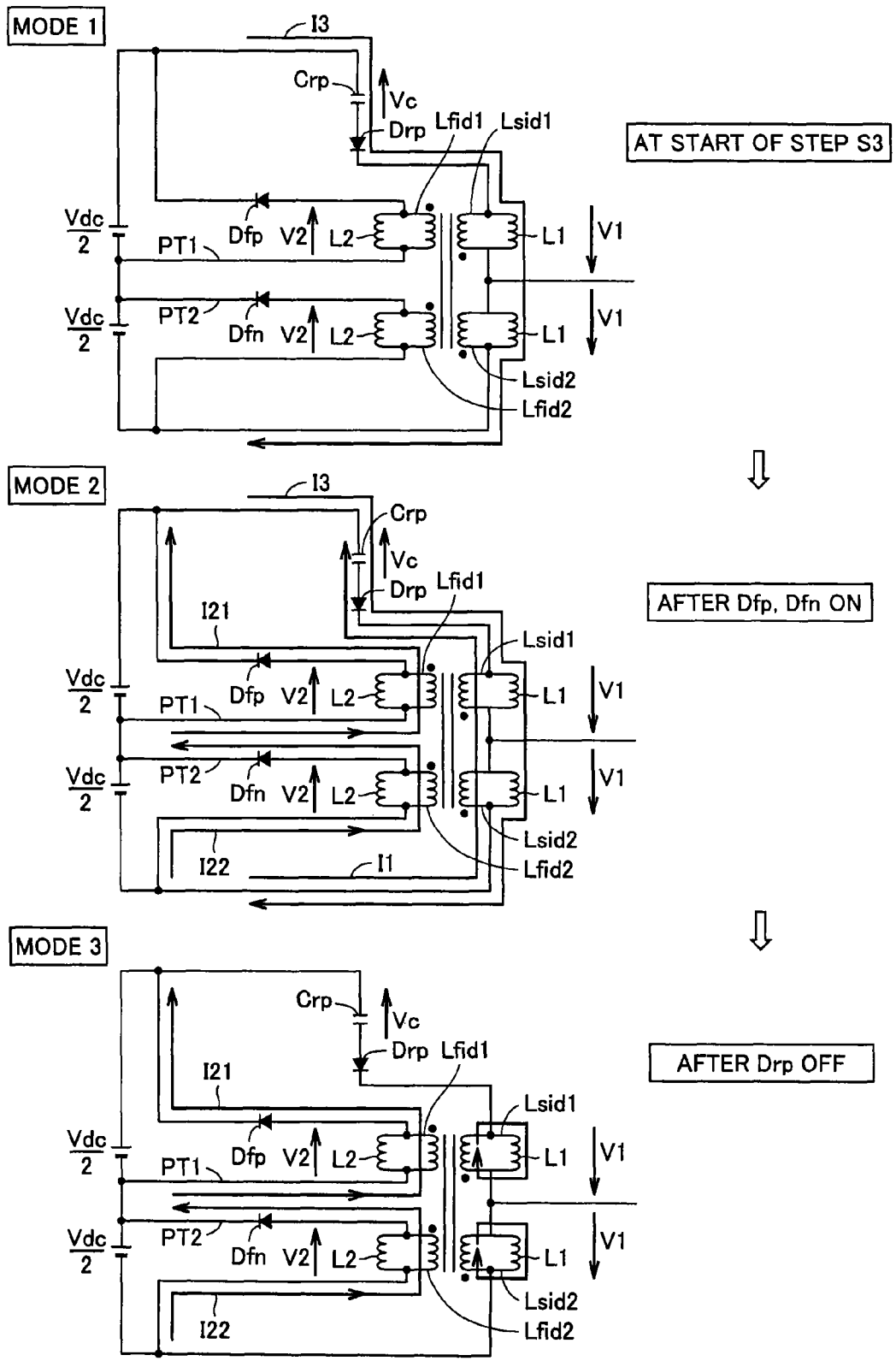
FIG. 5 represents the current flow in time series at step S3 and step S4 by the soft-switching inverter according to an embodiment of the present invention.
Figure 6:
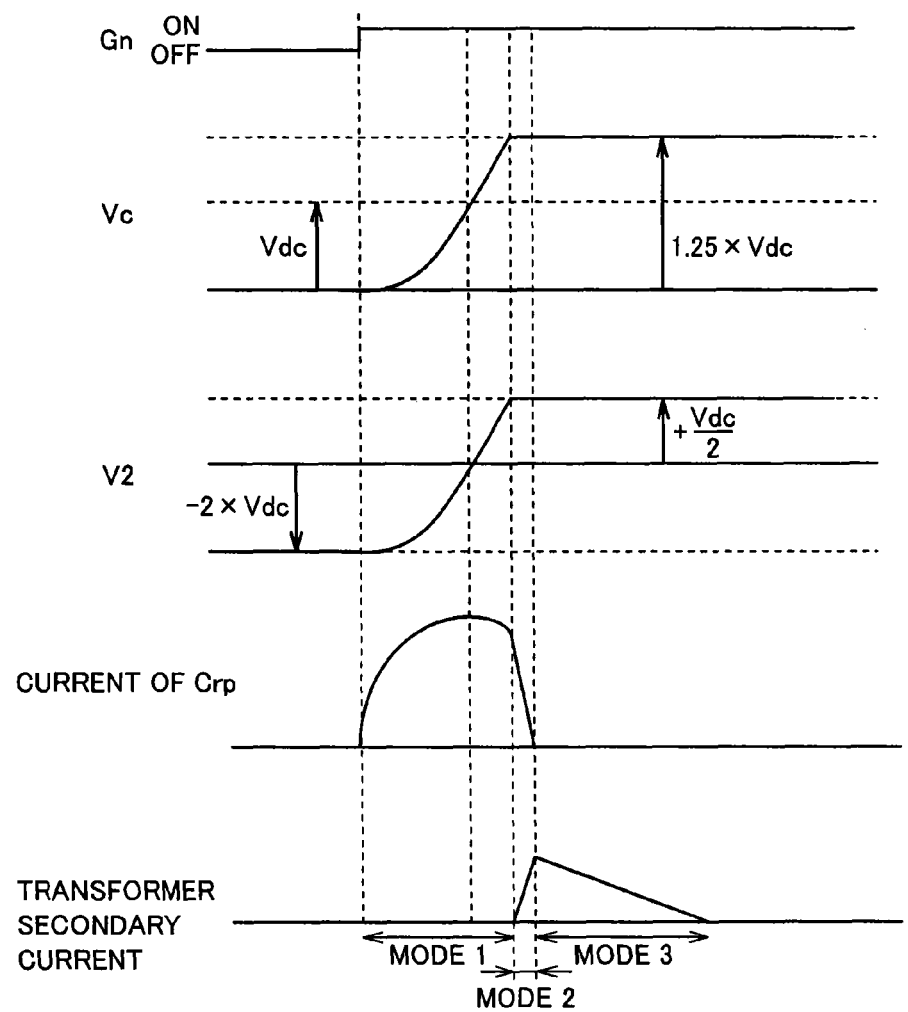
FIG. 6 is a waveform diagram of voltage and current at step S3 and step S4 by the soft-switching inverter according to an embodiment of the present invention.

FIG. 5 represents the current flow in time series at step S3 and step S4 by the soft-switching inverter according to an embodiment of the present invention. FIG. 6 is a waveform diagram of voltage and current at step S3 and step S4 by the soft-switching inverter according to an embodiment of the present invention.

FIG. 5 represents an equivalent circuit of soft-switching inverter 101 at step S3 and step S4. In this equivalent circuit, any circuit not conducting at step S3 and step S4 will not be depicted. For the sake of facilitating the understanding of the operation, the section of transformer Tr is illustrated, divided into an ideal transformer and exciting inductance that is present in parallel at each winding.

Specifically, Lsid1, Lsid2 are primary windings of an ideal transformer. Lfid1, Lfid2 are secondary windings of an ideal transformer. L1 is the exciting inductance at the primary side of transformer Tr. L2 is the exciting inductance at the secondary side of transformer Tr. Description is based on the assumption that the turns ratio of transformer Tr is 1:4.

In this case, the voltage is V2=4×V1. Voltage Vdc corresponds to a power supply adding two DC power supplies Vp and Vn into one. The output voltage value thereof is Vdc=Vp+Vn. Voltage Vc is the voltage at snubber capacitor Crp. Voltage V1 is the voltage at the primary winding of transformer Tr. Voltage V2 is the voltage at the secondary winding of transformer Tr. The direction of each arrow corresponds to "positive".

Description is based on the case where the load current is zero to facilitate understanding. In this case, snubber capacitor Crp is not charged at all at step S2 set forth above, and advances to step S3 intact.

Referring to FIGS. 5 and 6, the voltage of (Vc−Vdc) is applied to the primary side of transformer Tr, i.e. V1=(Vc−Vdc)/2. Voltage V2 at the secondary side of transformer Tr is V2=2×(Vc−Vdc).

Step S3 will be described, divided into three modes 1-3 in time series. Specifically, mode 1 corresponds to the state after initiating step S3; mode 2 corresponds to the state after clamp diodes Dfp and Dfn are turned on; and mode 3 corresponds to the state after snubber diode Drp is turned off.

At the start of step S3, V2<0 since voltage Vc is zero. Therefore, current will not flow through the ideal transformer since clamp diodes Dfp and Dfn are not conducting. Meanwhile, resonant current I3 of exciting inductance L1 and snubber capacitor Crp flows through exciting inductance L1. Snubber capacitor Crp is charged by the flow of resonant current I3. Accordingly, voltage Vc at snubber capacitor Crp increases. By equation (2), when the voltage rises to Vc=1.25 Vdc, V2=2×(Vc−Vdc)=Vdc/2 is established. In other words, the secondary side voltage of transformer Tr becomes ½ times power supply voltage Vdc (mode 1).

Then, when the secondary side voltage of transformer Tr reaches ½ times power supply voltage Vdc, clamp diodes Dfp and Dfn are rendered conductive. Conduction of clamp diodes Dfp and Dfn causes currents I21 and I22 to flow through secondary windings Lfid1 and Lfid2 of the ideal transformer. By the function of the transformer, current I1 that is four times currents I21 and I22 flows through primary windings Lsid1 and Lsid2 of the ideal transformer. Here, current I1 functions to cancel the charging current of snubber capacitor Crp, i.e. current I3. Therefore, current I3 flowing through snubber capacitor Crp and snubber diode Drp becomes zero, whereby snubber diode Drp is turned off. Since voltage Vc will not rise due to the end of charging at snubber capacitor Crp, voltage Vc is maintained still at 1.25×Vdc (mode 2).

When snubber diode Drp is OFF, the exciting current at the primary side of transformer Tr circulates primary windings Lsid1 and Lsid2 of the ideal transformer. At this stage, power supply voltage Vdc/2 is applied at the secondary side since currents I21 and I22 continue to flow at the secondary side of transformer Tr. Therefore, at the primary side of transformer Tr, a voltage of V1=Vdc/8 is induced by the function of the transformer. The current flowing through exciting inductance L1 is gradually attenuated by the induced voltage to eventually become zero. As a result, the current flowing through primary windings Lsid1 and Lsid2 of the ideal transformer becomes zero. Also, the current flowing through secondary windings Lfid1 and Lfid2 becomes zero by the function of the transformer. Thus, diodes Dfp and Dfn are rendered OFF (mode 3).

At the soft-switching inverter according to an embodiment of the present invention, when voltage Vc at snubber capacitor Crp reaches voltage value VM in the event of snubber capacitor Crp being overcharged to a voltage higher than power supply voltage Vdc by the resonance, the energy directed to causing the current to flow through primary windings Ls1 and Ls2 of transformer Tr is shifted to secondary windings Lf1 and L12 of transformer Tr, so that no charging current will flow through snubber capacitor Crp. Therefore, the charging at snubber capacitor Crp is ceased, and the maximum voltage of snubber capacitor Crp is clamped at VM. By setting the turns ratio n of transformer Tr at n>2, VM becomes less than or equal to 1.5 times Vdc. Moreover, since VM (Vp+Vn)=Vdc by increasing n, voltage Vc at snubber capacitor Crp can be suppressed to a value infinitely close to power supply voltage Vdc.

[Operation in Negative Period]

Figure 7:
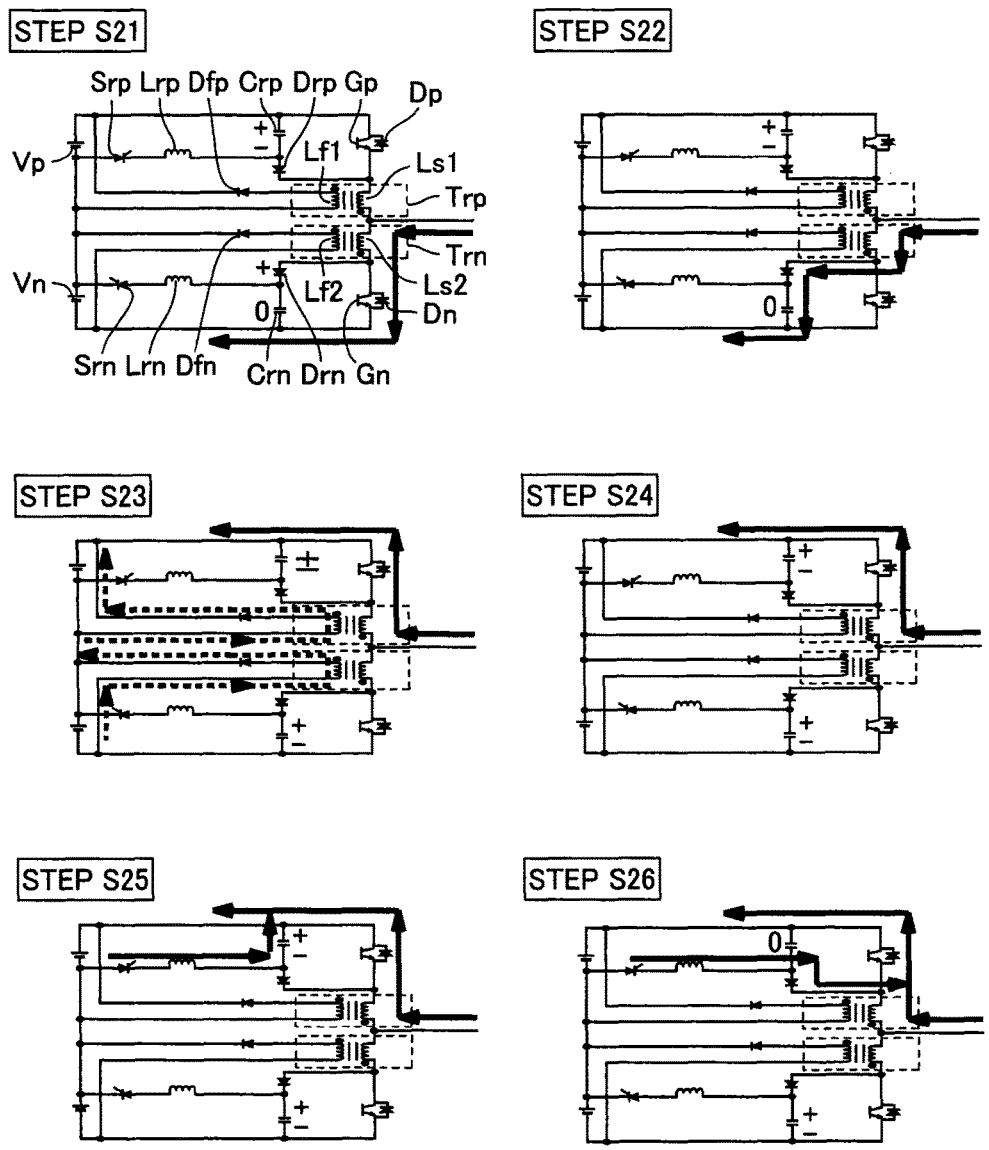
FIG. 7 represents the current flow in time series during power conversion by the soft-switching inverter according to an embodiment of the present invention.
Figure 8:
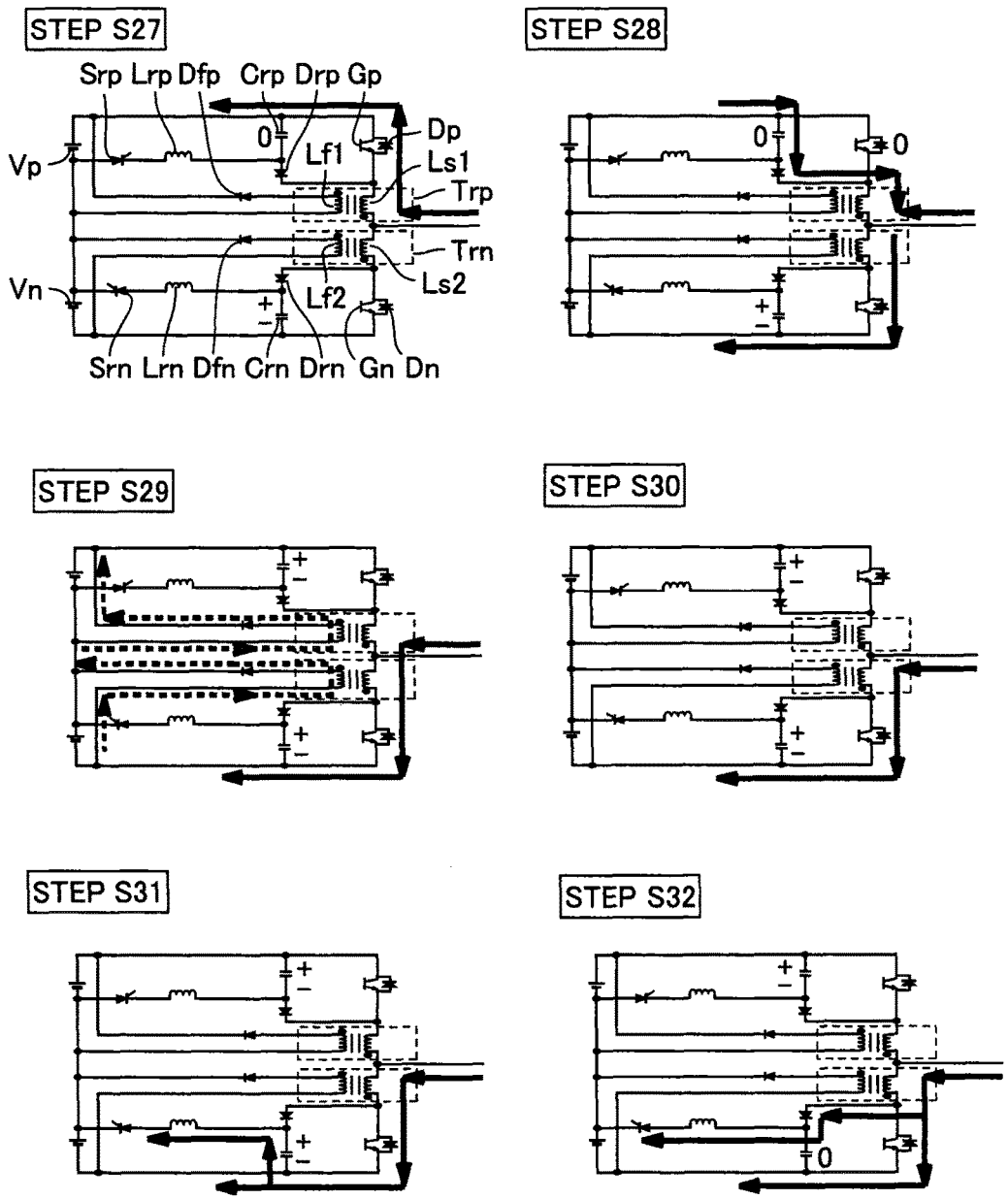
FIG. 8 represents the current flow in time series during power conversion by the soft-switching inverter according to an embodiment of the present invention.

FIGS. 7 and 8 represent in time series the flow of current during power conversion by the soft-switching inverter according to an embodiment of the present invention. As used herein, DC power supply Vp provides an output voltage of Vp, whereas DC power supply Vn provides an output voltage of Vn.

In FIGS. 7 and 8, the "+" and "−" signs added at the side of snubber capacitors Crp and Crn represent the polarity of the charge of the snubber capacitor.

The horizontal axis in FIG. 4 represents time. Each number in the "negative period" along the horizontal axis represents corresponding steps shown in FIGS. 7 and 8.

Referring to FIGS. 4, 7, and 8, first the state (step S21) will be described where main switch Gn is controlled to be turned on, main switch Gp is controlled to be turned off, and auxiliary switches Srn and Srp are controlled to be turned off, so that current flows from DC power supply Vn to the load through main switch Gn.

Under this state, main switch Gn is controlled to be turned off. This causes commutation of the current from the load to snubber capacitor Crn. Accordingly, snubber capacitor Crn is charged. When the voltage at snubber capacitor Crn becomes equal to the output voltages (Vn+Vp)=Vdc)) of DC power supplies Vn and Vp, main diode Dp is rendered conductive. Conduction of main diode Dp causes the current from the load to flow to DC power supply Vp through main diode Dp (step S22).

At the time of starting step S22, current flows to snubber capacitor Crn when main switch Gn is controlled to be turned off. Since the charge in snubber capacitor Crn is zero when main switch Gn is rendered OFF, voltage is not applied to main switch Gn. Accordingly, zero volt switching is realized.

Then, the current flowing from snubber diode Drn to snubber capacitor Crn decreases by the resonance of snubber capacitor Crn with the exciting inductance at primary windings Ls1 and Ls2.

Moreover, snubber capacitor Crn is charged by the resonant current of snubber capacitor Crn with the exciting inductance of primary windings Ls1 and Ls2 of transformer Tr. At this stage, a voltage corresponding to the difference between the output voltages (Vp+Vn(=Vdc)) of DC power supplies Vn and Vp and a voltage Vc at snubber capacitor Crn is applied to the series circuit of primary windings Ls1 and Ls2 of transformer Tr. Primary windings Ls1 and Ls2 will each carry ½ the aforementioned differential voltage. Specifically, the value of the voltage VL applied to primary windings Ls1 and Ls2 is represented by equation (5) set forth below.

$$VL=\{(Vn+Vp)-Vc\}/2=(Vdc-Vc)/2 \quad (5)$$

Since the turns ratio of transformer Tr is 1:n, a voltage of n×VL is induced at the secondary side. When voltage Vc at snubber capacitor Crn rises and the secondary side voltage of transformer Tr arrives at (Vn+Vp), clamp diodes Dfp and Dfn are turned ON and snubber diode Drn is turned OFF. Maximum value VM of voltage Vc at this stage is represented by equation (6) set forth below.

$$VM=(1+1/n)\times(Vn+Vp)=(1+1/n)\times Vdc \quad (6)$$

Then, current flows as indicated by the broken line shown at step S23 in FIG. 5. The current flowing to snubber capacitor Crn becomes zero, so that snubber capacitor Crn is no longer charged. Accordingly, voltage Vc at snubber capacitor Crn is clamped at VM. Then, when the current flowing through clamp diodes Dfp and Dfn is reduced to eventually become zero, clamp diodes Dfp and Dfn are rendered OFF. The commutation through current paths PT1 and PT2 ends (step S23).

At an elapse of a predetermined time Tb from main switch Gn being turned off, main switch Gp is controlled to be turned on. However, main switch Gp is not rendered conductive since the current from the load to main diode Dp has a current polarity opposite to the conducting direction of main switch Gp. Therefore, current will continuously flow towards DC power supply Vp through main diode Dp (step S24). In other words, current does not flow through main switch Gp when main switch Gp is controlled to be turned on. Accordingly, zero current switching is realized.

Then, at an elapse of a predetermined time Td (≥0) from main switch Gp being turned on, auxiliary switch Srp is controlled to be turned on. Accordingly, discharging starts at snubber capacitor Crp. When discharging is completed and the voltage at snubber capacitor Crp becomes zero, snubber diode Drp is rendered conductive (step S25).

The conduction of snubber diode Drp causes voltage from DC power supply Vp to be applied to auxiliary reactor Lrp. Accordingly, the current flowing through auxiliary switch Srp is reduced to eventually become zero. In response, auxiliary switch Srp and snubber diode Drp are both turned OFF (step S26).

Then, at an elapse of a predetermined time Tc from auxiliary switch Srp being turned on, main switch Gp is controlled to be turned off. In other words, under the state where main diode Dp is still conductive so that the current from the load continuously flows to DC power supply Vp through main diode Dp, main switch Gp is controlled to be turned off (step S27). At this stage, there is no change in the status since main switch Gp is ON, but not conducting.

Then, at an elapse of a predetermined time Tb from main switch Gp being turned off, main switch Gn is controlled to be turned on. This causes commutation of the current from main diode Dp to main switch Gn. When the current flowing from DC power supply Vn through main switch Gn increases to become equal to the load current, the current flowing through main diode Dp becomes zero at the same time, so that main diode Dp is turned off. Thus, the commutation is completed.

At the moment main diode Dp is turned off, snubber diode Drp is rendered conductive. Since the charge in snubber capacitor Crp is zero at this stage, the current flowing from DC power supply Vp flows towards snubber capacitor Crp. In other words, main diode Dp does not exhibit switching loss since no voltage is applied thereto. Accordingly, zero volt switching is realized (step S28).

Then, the current flowing from snubber capacitor Crp to snubber diode Drp is gradually reduced by the resonance of snubber capacitor Crp and the exciting inductance at primary windings Ls1 and Ls2.

Moreover, snubber capacitor Crp is charged by the resonant current of snubber capacitor Crn and the exciting inductance of primary windings Ls1 and Ls2 of transformer Tr. At this stage, a voltage corresponding to the difference between the output voltages (Vp+Vn(=Vdc)) of DC power supplies Vn and Vp and a voltage Vc at snubber capacitor Crp is applied to the series circuit of primary winding Ls1 and Ls2 of transformer Tr. Therefore, primary windings Ls1 and Ls2 will each carry ½ the aforementioned differential voltage. Specifically, the value VL of the voltage applied to primary windings Ls1 and Ls2 is represented by equation (7) set forth below.

$$VL=\{(Vn+Vp)-Vc\}/2=(Vdc-Vc)/2 \quad (7)$$

Since the turns ratio of transformer Tr is 1:n, a voltage of n×VL is induced at the secondary side. When voltage Vc at snubber capacitor Crp rises and the secondary side voltage of transformer Tr arrives at (Vn+Vp(=Vdc)), clamp diodes Dfp and Dfn are turned ON and snubber diode Drp is turned OFF. Maximum value VM of voltage Vc at this stage is represented by equation (8) set forth below.

$$VM=(1+1/n)\times(Vn+Vp)=(1+1/n)\times Vdc \quad (8)$$

Then, current flows as indicated by the broken line shown at step S29 in FIG. 6. The current flowing to snubber capacitor Crp becomes zero, so that snubber capacitor Crp is no longer charged. Accordingly, voltage Vc at snubber capacitor Crp is clamped at VM. Then, when the current flowing through clamp diodes Dfp and Dfn is reduced to eventually become zero, clamp diodes Dfp and Dfn are rendered OFF. The commutation through current paths PT1 and PT2 ends (step S29).

Then, the current from the load flows through main switch Gn to DC power supply Vn (step S30).

Then, at an elapse of a predetermined time Td (≥0) from main switch Gn being turned on, auxiliary switch Srn is controlled to be turned on. Accordingly, discharging starts at snubber capacitor Crn. When discharging is completed and the voltage at snubber capacitor Crn becomes zero, snubber diode Drn is rendered conductive (step S31).

The conduction of snubber diode Drn causes voltage from DC power supply Vn to be applied to auxiliary reactor Lrn. Accordingly, the current flowing through auxiliary switch Srn is reduced to eventually become zero. In response, auxiliary switch Srn and snubber diode Drn are both turned OFF, returning to the state of step S21 (step S32).

At the soft-switching inverter according to an embodiment of the present invention, when voltage Vc at the snubber capacitor reaches voltage value VM in the event of snubber capacitor Crn or Crp being overcharged to a voltage higher than power supply voltage Vdc by the resonance, the energy directed to causing the current to flow through primary windings Ls1 and Ls2 of transformer Tr is shifted to secondary windings Lf1 and L12 of transformer Tr, so that no charging current will flow through the snubber capacitor. Therefore, the charging at the snubber capacitor is ceased, and the maximum voltage of the snubber capacitor is clamped at VM. By setting the turns ratio n of transformer Tr at n>2, VM becomes less than or equal to 1.5 times Vdc. Moreover, since VM≈(Vn+Vp)=Vdc by increasing n, voltage Vc at the snubber capacitor can be suppressed to a value infinitely close to power supply voltage Vdc.

Soft-switching inverter 101 repeats the operation of steps S1-S12 shown in FIGS. 2 and 3 as the operation in the positive period, and repeats the operation of steps S21-S32 shown in FIGS. 7 and 8 as the operation in a negative period. By alternately performing such positive period operation and negative period operation, AC power is fed to the load.

<Comparison Between Soft-Switching Inverter 101 of Present Embodiment and Soft-Switching Inverter 101X as Reference Example>

To facilitate the understanding of soft-switching inverter 101 according to an embodiment of the present invention, a soft-switching inverter 101X of a reference example will be described for comparison.

Figure 9:
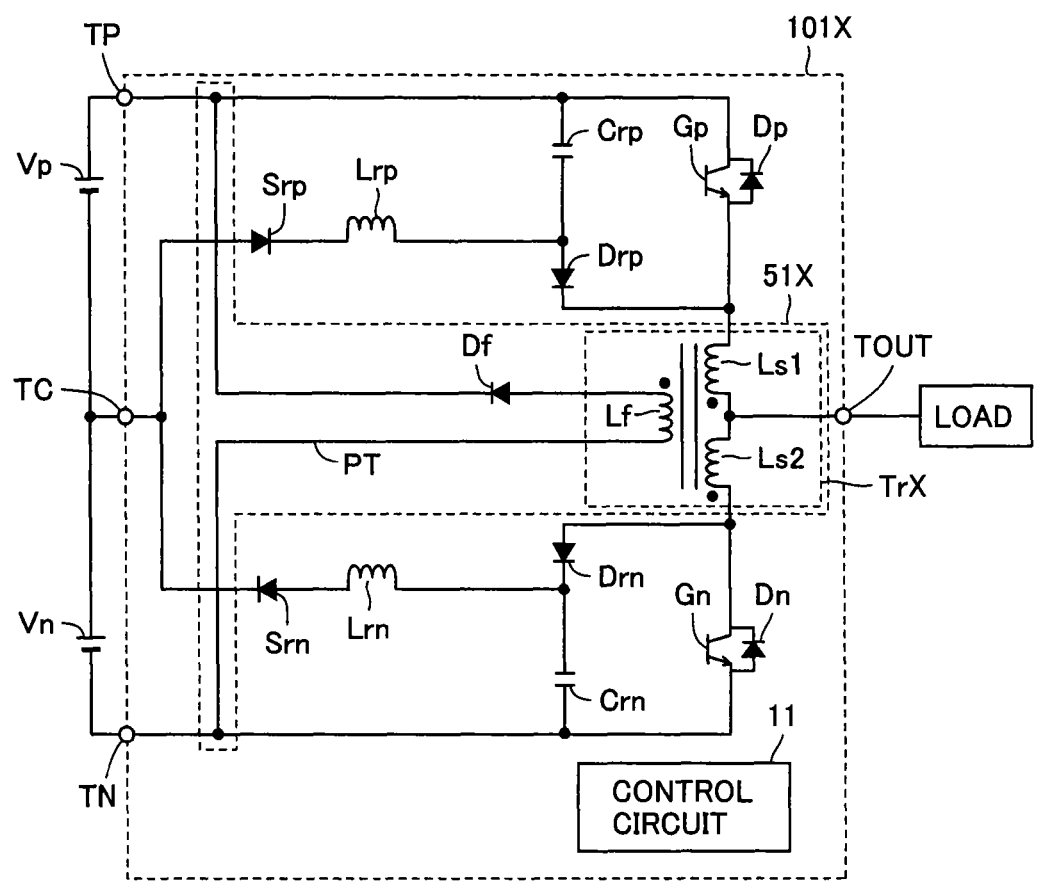
FIG. 9 represents a configuration of a soft-switching inverter 101X of a reference example.

FIG. 9 is a diagram representing a configuration of soft-switching inverter 101X as a reference example. Referring to FIGS. 1 and 9, soft-switching inverter 101X will be briefly described as compared to soft-switching inverter 101 according to an embodiment. Soft-switching inverter 101X includes a protection circuit 51X instead of protection circuit 51 of soft-switching inverter 101. Protection circuit 51X includes a transformer TrX, and a clamp diode Df. Transformer TrX includes primary windings Ls1 and Ls2, and a secondary winding Lf.

In other words, as compared to soft-switching inverter 101X, soft-switching inverter 101 has clamp diode Df divided into two clamp diodes Df1 and Df2, and similarly has secondary winding Lf of transformer Tr divided into two secondary windings Lf1 and Lf2. Secondary winding Lf1 and clamp diode Dfp are connected in series between power supply voltage terminals TP and TCP. Secondary winding Lf2 and clamp diode Dfn are connected in series between power supply terminals TCN and TN. The remaining elements are similar to those of soft-switching inverter 101. Therefore, description thereof will not be repeated.

Differing from protection circuit 51 according to an embodiment, protection circuit 51X of the reference example renders clamp diode Df conductive provided on current path PT to complete charging of the snubber capacitor (Cs1, Cs2), when the snubber capacitor (Cs1, Cs2) is charged to a level greater than or equal to a predetermined voltage.

Here, let us consider the maximum voltage applied to the snubber capacitor constituting soft-switching inverter 101 and soft-switching inverter 101X.

Maximum voltage VM applied to snubber capacitor Crp (Crn) of the reference example becomes (1+2/n) Vdc, likewise with the discussion set forth above. Maximum voltage VM applied to snubber capacitor Crp (Crn) according to an embodiment becomes (1+1/n) Vdc by equations (4) and (6).

Since n is greater than 2, the maximum voltage applied to the snubber capacitor of soft-switching inverter 101X takes a value lower than 2 Vdc. In contrast, the maximum voltage applied to the snubber capacitor of soft-switching inverter 101 according to the present embodiment can be suppressed to take a value lower than 1.5 Vdc. It is therefore appreciated that the voltage suppression effect is higher than that of the reference example.

It is to be noted that the maximum value of the applied voltage can be reduced at soft-switching inverter 101X of the reference example by selecting a large turns ratio n. However, to this end, the voltage at the secondary side of the transformer becomes extremely high, leading to the requirement of elements of high breakdown voltage for both the transformer and clamp diode. This is not practical since the cost will be increased.

By employing the configuration of soft-switching inverter 101 according to the embodiment set forth above, the maximum voltage of the snubber capacitor can be reduced to allow the size and cost of the device to be reduced. The value of the maximum voltage applied to main switches Gp and Gn, main diodes Dp and Dn, and clamp diodes Drp and Drn can be also reduced.

The embodiment of the present invention will be summarized with reference to the drawings.

As shown in FIG. 1, soft-switching inverter 101 of the present embodiment is a power conversion apparatus for converting DC power, supplied from a DC power supply Vp having a first electrode and a second electrode and from a DC power supply Vn having a first electrode connected to the second electrode of DC power supply Vp and a second electrode, into AC power, and supplying the AC power to a load; including: a main switch Gp having a first end coupled to the first electrode of DC power supply Vp and a second end coupled to the load; a main diode Dp connected in parallel with main switch Gp, so as to have a conducting direction opposite to the conducting direction of main switch Gp; a snubber capacitor Crp connected in parallel with main switch Gp and main diode Dp; a snubber diode Drp connected in series with snubber capacitor Crp and connected between snubber capacitor Crp and the second end of main switch Gp so as to have a conducting direction identical to the conducting direction of main switch Gp; an auxiliary switch Srp and an auxiliary reactor Lrp connected between a connection node of DC power supplies Vp and Vn and a connection node of snubber capacitor Crp and snubber diode Drp, and in series with each other; a main switch Gn having a first end coupled to the second end of main switch Gp and a second end coupled to the second electrode of DC power supply Vn, provided so as to have a conducting direction identical to the conducting direction of main switch Gp; a main diode Dn connected in parallel with main switch Gn so as to have a conducting direction opposite to the conducting direction of main switch Gn; a snubber capacitor Crn connected in parallel with main switch Gn and main diode Dn; a snubber diode Drn connected in series with snubber capacitor Crn and between snubber capacitor Crn and the first end of main switch Gn so as to have a conducting direction identical to the conducting direction of main switch Gn; an auxiliary switch Srn and an auxiliary reactor Lrn connected between a connection node of DC power supplies Vp and Vn with auxiliary switch Srp or auxiliary reactor Lrp and a connection node of snubber capacitor Crn and snubber diode Drn, and connected in series with each other; and a protection circuit 51 for causing, when voltage applied to snubber capacitor Crp becomes greater than or equal to a predetermined value or when voltage applied to snubber capacitor Crn becomes greater than or equal to the predetermined value, a charging current formerly flowing from DC power supply Vp and DC power supply Vn to snubber capacitor Crp or snubber capacitor Crn to flow to another current path. Protection circuit 51 includes transformers Trp and Trn, and clamp diodes Dfp and Dfp. Transformer Trp includes a primary winding Ls1 connected between the second end of main switch Gp and the load, and a secondary winding Lf1 connected between the first electrode of DC power supply Vp and the second electrode of DC power supply Vp, and magnetically coupled to the primary winding. Transformer Trn includes a primary winding Ls2 connected between the first end of main switch Gn and the load, and a secondary winding Lf2 connected between the first electrode of DC power supply Vn and the second electrode of DC power supply Vn, and magnetically coupled to the primary winding. Secondary winding Ls1 and clamp diode Dfp are connected in series between the first electrode of DC power supply Vp and the second electrode of DC power supply Vp. Secondary winding Ls2 and clamp diode Dfn are connected in series between the first electrode of DC power supply Vn and the second electrode of DC power supply Vn. Secondary winding Ls1 and clamp diode Dfp are connected in series. Primary winding Lf1 and primary winding Lf2 are connected in series. The connection node of primary winding Lf1 and primary winding Lf2 is connected to the load.

Preferably, as shown in FIG. 1, soft-switching inverter 101 further includes a control circuit 11 for controlling main switch Gp, main switch Gn, auxiliary switch Srp and auxiliary switch Srn to be turned ON and OFF.

Further preferably, as shown in FIG. 4, control circuit 11 discharges snubber capacitor Crn by controlling auxiliary switch Srn to be turned on while main diode Dn is ON during a positive period in which current flows from the power conversion apparatus to the load, and discharges snubber capacitor Crp by controlling auxiliary switch Srp to be turned on while main diode Dp is ON during a negative period in which current flows from the load to the power conversion apparatus.

Further preferably, as shown in FIG. 4, control circuit 11 controls main switch Gn to be turned on at an elapse of a predetermined time from main switch Gn being turned off, controls auxiliary switch Srn to be turned on at an elapse of a predetermined time from main switch Gn being turned off, controls main switch Gn to be turned off at an elapse of a predetermined time from auxiliary switch Srn being turned on, controls main switch Gp to be turned on at an elapse of a predetermined time from main switch Gn being turned off, controls auxiliary switch Srp to be turned on at an elapse of a predetermined time from main switch Gp being turned on, and controls main switch Gp to be turned off at an elapse of a predetermined time from auxiliary switch Srp being turned on.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST

11 control circuit; 51, 51X protection circuit; 101, 101X soft-switching inverter; Crp, Crn snubber capacitor; Df, Df1, Df2 clamp diode; Dp, Dn main diode; Drp, Drn snubber diode; Gp, Gn main switch; Ls1, Ls2 primary winding; Lf, Lf1, Lf2 secondary winding; Lrp, Lrn auxiliary reactor; Srp, Srn auxiliary switch; PT1, PT2, PT current path.

The invention claimed is:

1. A power conversion apparatus for converting DC power, supplied from a first DC power supply having a first electrode and a second electrode, and from a second DC power supply having a first electrode connected to a second electrode of said first DC power supply and a second electrode, into AC power, and supplying the AC power to a load, said power conversion apparatus comprising:
   a first main switch having a first end coupled to the first electrode of said first DC power supply, and a second end coupled to said load,
   a first main diode connected in parallel with said first main switch, so as to have a conducting direction opposite to the conducting direction of said first main switch,
   a first snubber capacitor connected in parallel with said first main switch and said first main diode,
   a first snubber diode connected in series with said first snubber capacitor and connected between said first snubber capacitor and the second end of said first main switch, so as to have a conducting direction identical to the conducting direction of said first main switch,
   a first auxiliary switch and a first auxiliary reactor connected between a connection node of said first DC power supply and said second DC power supply and a connection node of said first snubber capacitor and said first snubber diode, and connected in series with each other,
   a second main switch having a first end coupled to the second end of said first main switch and the second end coupled to the second electrode of said second DC power supply, provided so as to have a conducting direction identical to the conducting direction of said first main switch,
   a second main diode connected in parallel with said second main switch, so as to have a conducting direction opposite to the conducting direction of said second main switch,
   a second snubber capacitor connected in parallel with said second main switch and said second main diode,
   a second snubber diode connected in series with said second snubber capacitor, and connected between said second snubber capacitor and the first end of said second main switch, so as to have a conducting direction identical to the conducting direction of said second main switch,
   a second auxiliary switch and a second auxiliary reactor connected between a connection node of said first DC power supply and said second DC power supply and a connection node of said second snubber capacitor and said second snubber diode, and connected in series with each other, and
   a protection circuit for causing, when voltage applied to said first snubber capacitor becomes greater than or equal to a predetermined value or when voltage applied to said second snubber capacitor becomes greater than or equal to the predetermined value, a charging current formerly flowing from said first DC power supply and said second DC power supply to said first snubber capacitor or said second snubber capacitor to flow to another current path, said protection circuit including
   a first transformer and a second transformer, and
   a first clamp diode and a second clamp diode,
     said first transformer including a first primary winding connected between the second end of said first main switch and said load, and a first secondary winding connected between the first electrode of said first DC power supply and the second electrode of said first DC power supply, and magnetically coupled to said first primary winding, said second transformer including a second primary winding connected between the first end of said second main switch and said load, and a second secondary winding connected between the first electrode of said second DC power supply and the second electrode of said second DC power supply, and magnetically coupled to said second primary winding, said first secondary winding and said first clamp diode connected in series between the first electrode of said first DC power supply and the second electrode of said first DC power supply, said second secondary winding and said second clamp diode connected in series between the first electrode of said second DC power supply and the second electrode of said second DC power supply, said first secondary winding and said first clamp diode connected in series, and said first primary winding and said second primary winding connected in series, and the connection node of said first primary winding and said secondary primary winding connected to said load.

2. The power conversion apparatus according to claim 1, further comprising a control circuit for controlling said first main switch, said second main switch, said first auxiliary switch, and said second auxiliary switch to be turned ON and OFF.

3. The power conversion apparatus according to claim 2, wherein said control circuit discharges said second snubber capacitor by controlling said second auxiliary switch to be turned on while said second main diode is ON during a positive period in which current flows from said power conversion apparatus to said load, and discharges said first snubber capacitor by controlling said first auxiliary switch to be turned on while said first main diode is ON during a negative period in which current flows from said load to said power conversion apparatus.

4. The power conversion apparatus according to claim 2, wherein said control circuit controls said second main switch to be turned on at an elapse of a predetermined time from first main switch being turned off, controls said second auxiliary switch to be turned on at an elapse of a predetermined time from said second main switch being turned on, controls said second main switch to be turned off at an elapse of a predetermined time from said second auxiliary switch being turned on, controls said first main switch to be turned on at an elapse of a predetermined time from said second main switch being turned off, controls said first auxiliary switch to be turned on at an elapse of a predetermined time from said first main switch being turned on, and controls said first main switch to be turned off at an elapse of a predetermined time from said first auxiliary switch being turned on.

\* \* \* \* \*